US012443979B2

(12) United States Patent
Ferris et al.

(10) Patent No.: US 12,443,979 B2
(45) Date of Patent: Oct. 14, 2025

(54) ARTIFICIAL INTELLIGENCE ANALYTICS PLATFORM FOR CROSS-MEDIA ADVERTISING

(71) Applicant: Decentrix, inc., Denver, CO (US)

(72) Inventors: Matthew R Ferris, Thornton, CO (US); Taras Bugir, Golden, CO (US)

(73) Assignee: Decentrix, Inc., Denver, CO (US)

( * ) Notice: Subject to any disclaimer, the term of this patent is extended or adjusted under 35 U.S.C. 154(b) by 0 days.

(21) Appl. No.: 16/716,480

(22) Filed: Dec. 16, 2019

(65) Prior Publication Data
US 2020/0364755 A1 Nov. 19, 2020

Related U.S. Application Data

(60) Provisional application No. 62/779,800, filed on Dec. 14, 2018.

(51) Int. Cl.
G06Q 30/00 (2023.01)
*G06Q 30/0241* (2023.01)
*G06Q 30/0601* (2023.01)

(52) U.S. Cl.
CPC ..... *G06Q 30/0276* (2013.01); *G06Q 30/0609* (2013.01)

(58) Field of Classification Search
CPC ........... G06Q 30/0276; G06Q 30/0275; G06Q 30/0244; G06Q 30/0609; G06Q 30/207–0277
See application file for complete search history.

(56) References Cited

U.S. PATENT DOCUMENTS 6,055,518 A * 4/2000 Franklin ................ G06Q 30/06
705/64
6,195,652 B1 * 2/2001 Fish .................... G06F 16/9537
707/999.102

(Continued)

OTHER PUBLICATIONS

Conley, et al. "Detecting Bidders Groups in Collusive Actions." American Economic Journal: Microeconomics 2016, vol. 8, No. 2, pp. 1-38. (Year: 2016).*

(Continued)

*Primary Examiner* — Luis A Brown
(74) *Attorney, Agent, or Firm* — FisherBroyles, LLP; Thomas J. Osborne, Jr.

(57) ABSTRACT

Media organizations are riding the wave of technology to multiple distribution platforms, sales channels and business models, and into a world of cross-platform advertising. The interrelated functions of ad sales are managed as a single system if an organization is to maximize advertising revenue. How does an organization manage, value, and optimize ad sales inventory in an ecosystem that has multiple sales channels competing for the same overlapping inventory segments in a multi-platform distribution model? Many organizations have tried to solve this problem with teams of analysts and consultants. However, conflicting goals and siloed analysis lead these teams to failure. Artificial intelligence is better equipped to cope with the overwhelming complexities of these mixed business models. By making decisions with a holistic view of the business, artificial intelligence can drive increased revenues through optimized allocation, placement, and pricing strategies across sales channels. The analytics platform supports and maximizes the revenues that can be achieved through cross-media advertising by integrating disparate advertising ecosystems using artificial intelligence.

13 Claims, 6 Drawing Sheets

(56) References Cited

U.S. PATENT DOCUMENTS

| | | | | |
|---|---|---|---|---|
| 6,985,885 | B1* | 1/2006 | Goldberg | G06Q 30/06 705/37 |
| 8,260,657 | B1* | 9/2012 | Conway | H04N 21/2543 705/28 |
| 8,412,560 | B1* | 4/2013 | Masud | G06Q 30/00 705/7.35 |
| 2001/0047297 | A1* | 11/2001 | Wen | G06Q 30/0275 705/14.55 |
| 2003/0083932 | A1* | 5/2003 | Wolf | G06Q 30/0275 705/14.66 |
| 2004/0193488 | A1* | 9/2004 | Khoo | G06Q 30/0272 348/E7.071 |
| 2005/0027594 | A1* | 2/2005 | Yasnovsky | G06Q 30/0257 705/14.69 |
| 2005/0187818 | A1* | 8/2005 | Zito | G06Q 30/0254 705/14.69 |
| 2007/0027771 | A1* | 2/2007 | Collins | G06Q 30/0263 705/14.54 |
| 2007/0033103 | A1* | 2/2007 | Collins | G06Q 30/0255 705/14.41 |
| 2007/0078714 | A1* | 4/2007 | Ott | G06Q 30/0273 705/14.69 |
| 2007/0088625 | A1* | 4/2007 | Fish | G06Q 30/02 705/26.7 |
| 2007/0130015 | A1* | 6/2007 | Starr | H04N 21/858 705/14.46 |
| 2007/0150537 | A1* | 6/2007 | Graham | G06Q 30/02 709/203 |
| 2007/0192356 | A1* | 8/2007 | O'Kelley | G06Q 30/02 707/999.102 |
| 2007/0214045 | A1* | 9/2007 | Subramanian | G06Q 30/08 705/14.69 |
| 2007/0244760 | A1* | 10/2007 | Bodnar | G06Q 30/08 705/14.73 |
| 2007/0294192 | A1* | 12/2007 | Tellefsen | G06Q 30/0283 705/400 |
| 2008/0140522 | A1* | 6/2008 | Tutone | G06Q 30/0273 705/1.1 |
| 2009/0006192 | A1* | 1/2009 | Martinez | G06Q 30/02 705/14.69 |
| 2011/0173126 | A1* | 7/2011 | Knapp | G06Q 30/02 705/14.71 |
| 2012/0016808 | A1* | 1/2012 | Ramani | G06Q 30/0244 705/36 R |
| 2013/0231999 | A1* | 9/2013 | Emrich | G06Q 30/0271 705/14.43 |
| 2013/0246207 | A1* | 9/2013 | Novak | G06Q 30/0641 705/26.2 |
| 2015/0134463 | A1* | 5/2015 | Jalali | G06Q 30/0275 705/14.71 |
| 2016/0063538 | A1* | 3/2016 | Srivastava | G06Q 30/0244 705/14.43 |
| 2016/0210661 | A1* | 7/2016 | Chittilappilly | G06Q 30/0249 |
| 2016/0217490 | A1* | 7/2016 | Malik | G06Q 30/0247 |
| 2017/0018009 | A1* | 1/2017 | Farahat | G06Q 30/0275 |
| 2018/0018732 | A1* | 1/2018 | Wang | G06Q 30/08 |
| 2018/0040032 | A1* | 2/2018 | Chalasani | G06Q 30/0277 |
| 2018/0308124 | A1* | 10/2018 | Gao | G06N 20/00 |
| 2018/0308159 | A1* | 10/2018 | Knijnik | G06N 20/20 |
| 2018/0330398 | A1* | 11/2018 | Nesamoney | G06N 3/08 |
| 2019/0080394 | A1* | 3/2019 | Wang | G06Q 30/08 |
| 2019/0080799 | A1* | 3/2019 | Galuten | G06N 5/04 |
| 2019/0266557 | A1* | 8/2019 | Berk | G06Q 50/12 |
| 2019/0392485 | A1* | 12/2019 | Calauzènes | G06Q 30/0277 |
| 2020/0007934 | A1* | 1/2020 | Ortiz | H04N 21/25883 |
| 2020/0019995 | A1* | 1/2020 | Krishnan | G16H 10/20 |
| 2020/0021873 | A1* | 1/2020 | Swaminathan | H04N 21/466 |
| 2020/0364755 | A1* | 11/2020 | Ferris | G06Q 30/0609 |
| 2021/0067544 | A1* | 3/2021 | Taylor | G06Q 30/02 |

OTHER PUBLICATIONS

Chen, et al. "Real-Time Bidding Algorithms for Performance-Based Display Ad Allocation." International Conference on Knowledge, Discovery, and Data Mining '11, Aug. 21-24, 2011, San Diego CA. (Year: 2011).*

* cited by examiner

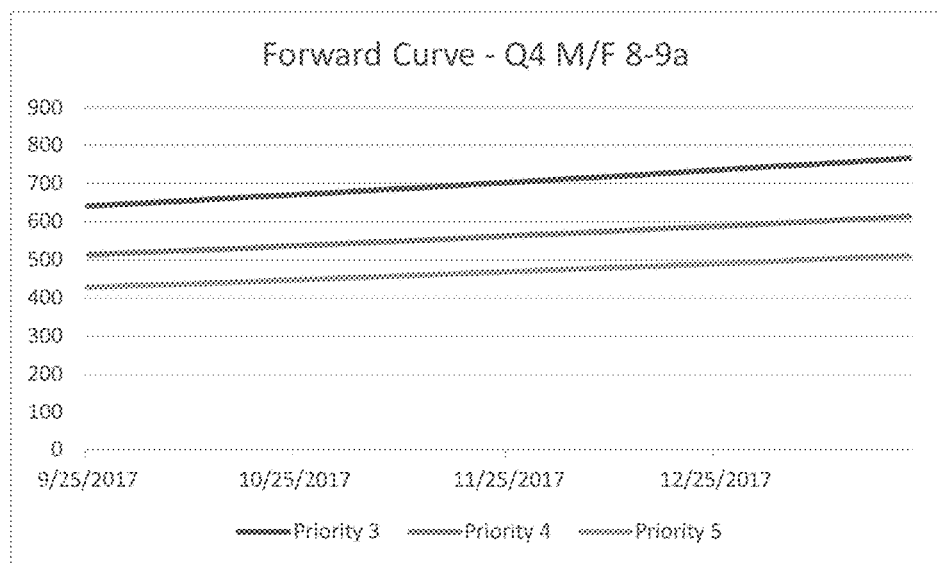
FIG. 9 Upfront rates for M-F 8-9a Q4 transmission dates generated on 5/15 using an inflation rate of 0.05%, priority 5 spot rate of $350 and risk premiums of 1.2 and 1.5 for priority 4 and priority 3
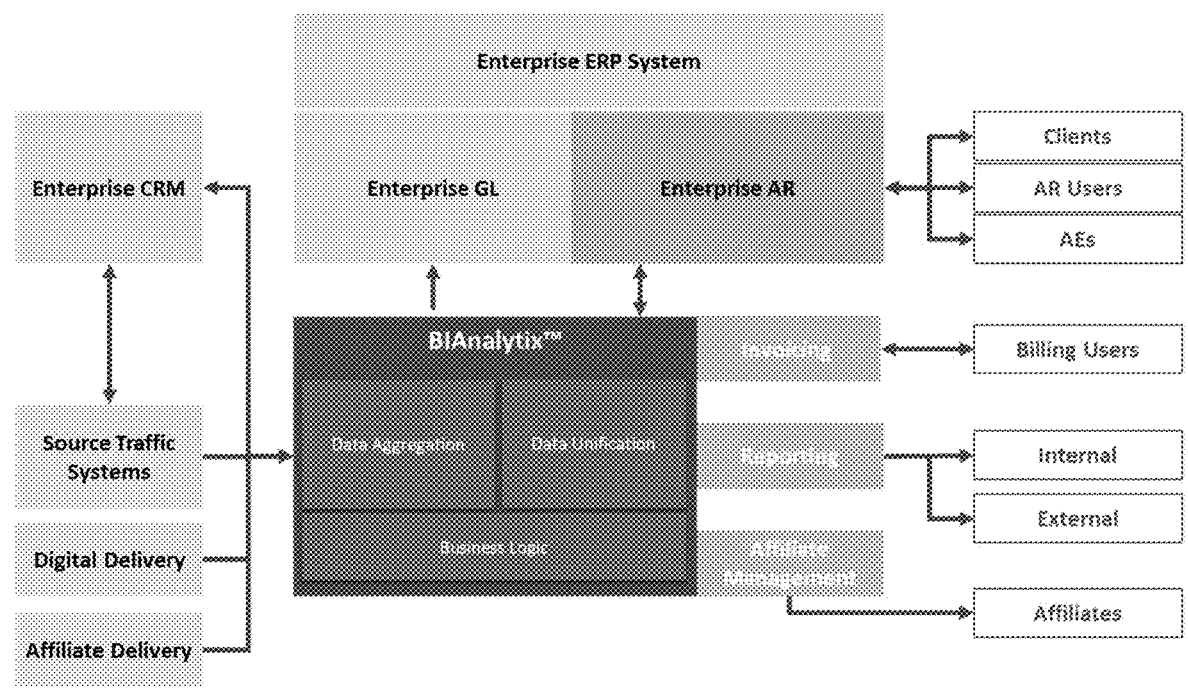
FIG. 10

ARTIFICIAL INTELLIGENCE ANALYTICS PLATFORM FOR CROSS-MEDIA ADVERTISING

CROSS-REFERENCE TO RELATED APPLICATIONS

This application claims the benefit of U.S. provisional application No. 62/779,800, filed 14 Dec. 2018, which is hereby incorporated by reference as though fully set forth herein.

BACKGROUND a. Field

The instant invention relates to an artificial intelligence platform and method adapted for providing cross-media advertising.

b. Background

Media organizations are riding the wave of technology to multiple distribution platforms, sales channels and business models, and into a world of cross-platform advertising. The interrelated functions of ad sales should be managed as a single system if an organization is to maximize advertising revenue. Many organizations have tried to solve the problem of managing, valuing, and optimizing ad sales inventory in an ecosystem that has multiple sales channels competing for the same overlapping inventory segments in a multi-platform distribution model with teams of analysts and consultants. However, conflicting goals and siloed analysis lead these teams to failure.

BRIEF SUMMARY

Artificial intelligence is better equipped to cope with the overwhelming complexities of these mixed business models. By making decisions with a holistic view of the business, artificial intelligence can drive optimized allocation, placement, and pricing strategies across sales channels. The analytics platform can be adapted to support and maximize (or at least significantly improve) the revenues that can be achieved through cross-media advertising by integrating disparate advertising ecosystems using artificial intelligence.

Unique artificial intelligence techniques are provided, including process, and methods by which a platform is adapted to unify and optimize an entire cross-media advertising supply chain through a holistic yield management process. Solutions provided herein can be applied to both ends of the supply chain, such as maximizing return on investment on a buy side or maximizing revenues on a sell side. The platform can stand as a complete solution, or it can work synergistically with any and all parts of the system or process.

The foregoing and other aspects, features, details, utilities, and advantages of the present invention will be apparent from reading the following description and claims, and from reviewing the accompanying drawings.

BRIEF DESCRIPTION OF THE DRAWINGS

FIG. 9 is a graph showing an example of an upfront rate curve.

FIG. 10 is a block diagram showing an example module of an artificial intelligence analytics platform

DETAILED DESCRIPTION

Figure 1:
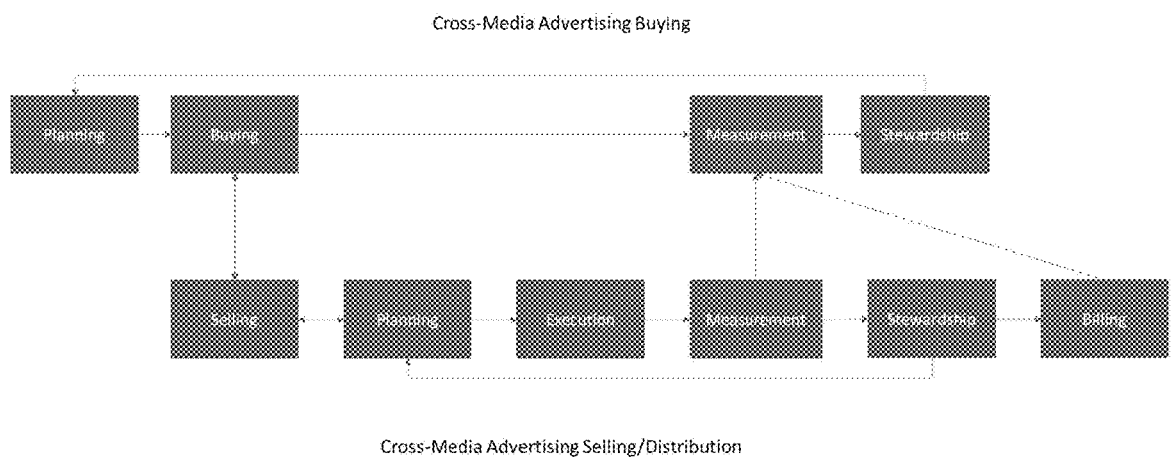
FIG. 1 is a block diagram showing an example of a traditional high-level supply chain.

Unique artificial intelligence techniques are provided, including process, and methods by which a platform is adapted to unify and optimize an entire cross-media advertising supply chain through a holistic yield management process. Solutions provided herein can be applied to both ends of the supply chain, such as maximizing return on investment on a buy side or maximizing revenues on a sell side. The platform can stand as a complete solution, or it can work synergistically with any and all parts of the system or process.

Regardless of the distribution technology, most media enterprises mismanage the ad sales process through siloed inventory allocation, campaign planning, and campaign stewardship. These processes are further broken down into in-flight and post campaign management. Few organizations manage any of these functions against a broader organizational goal, resulting in poor management and utilization of inventory and therefore sub-optimal revenue. The interconnectedness of different ad sales functions and the delicate complexity of the entire ad sales ecosystem can be analyzed as advertisers enter various sales channels to reach viewers across multiple distribution mediums. In addition, as provided herein, a global, artificial intelligence-based improvement or optimization solution can be adapted to navigate these complexities in a technological manner to better manage and utilize inventory, effectively drive dynamic pricing, and ultimately increase revenues.

Cross-Media Advertising Supply Chain

A cross-media advertising supply chain is a sequence of processes involved in the purchase of advertising inventory across any and all distribution mediums, the associated processes for delivering the contracted advertising inventory, and the subsequent invoicing of the delivered inventory.

Definitions

Advertising Campaign—A contractual obligation that determines advertising inventory to be supplied by a Seller and used to deliver an advertisement over a specified time period and/or until a specified goal is met. The contractual obligation may or may not be constrained by other factors that limit or refine where and how the advertisement can be delivered.

Advertising Inventory—The vehicle and form of measurement used to deliver advertising messages to viewers.

Billing—The creation and delivery of invoices and other accounting processes upon the verified completion of delivered advertising campaigns.

Buyer—The advertiser, agency, or marketer responsible for the buying process.

Buying—The process of acquiring advertising inventory.

Execution—The act, external to an analytics platform, that delivers advertising messages to viewers.

Measurement—The verified number of viewers who have and will receive an advertising campaign.

Optimization—Although particular examples described herein provide platforms and methods configured to optimize one or more performance, characteristic, factor, etc., other examples are contemplated in each case for platforms and methods adapted to improve such as performance, characteristic, factor, etc. without necessarily providing an optimal solution.

Planning—The process of determining the degree to which a campaign can be faithfully delivered based on the parameters of the campaign and creating the instruction sets for the systems responsible for execution.

Sales Funnel—the traditional sales and marketing funnel that indicates a consumer's position in a sales or marketing cycle.

Seller—The content publisher or distributer which owns or is responsible for acquiring the advertising inventory used to deliver an advertising campaign requested by a buyer.

Selling—The process of selling advertising inventory and/or maintaining relationships with account managers who buy advertising inventory.

Stewardship—The process of adjusting the planning process to improve the achievement of the objective by which an advertising campaign's success is measured against.

FIG. 1 shows a traditional high-level supply chain. There are generally two marketing goals of an advertising campaign or promotional campaign in a media context: grow new market share or audiences and maintain existing market share or audience loyalty. When considering a piece of content or product for marketing, the two goals are ubiquitous. A product may be required raise awareness or may also be promoted to remind existing consumers that they should continue consuming.

There is a close relationship between the content or products available to promote and a strategy used to promote those as they relate to the goal. Similar to budgets, the content library limits what can be promoted.

Marketing can determine the overall strategy and how much budget to pour into each of the components of brand awareness and conversion.

Traditional Buying Processes: Based on campaign planning, the buy is executed, typically through a relationship with multiple sellers based on a relationship between the agency buyer and the seller's account executive. This typically entails negotiations back and forth until both parties can converge on a contract.

Campaign Planning: Traditional media planning has always been done holistically for the brand, but then broken into silos to plan and execute different parts of the actual plan. Typically, there are people who specialize in linear, digital, and even programmatic sales channels. This aligns very closely to the process that exist on the selling side to compliment this workflow.

Campaign Stewardship: The stewardship process is typically quite delayed and more focused on reconciling what was ordered with what was delivered. The campaign is typically not adjusted throughout the flight unless severe performance issues are discovered and in that case there is typically buyer/seller renegotiation.

Traditional Selling Processes

Campaign Planning: Once allocations have been made, from the inventory owner's perspective, the campaign planning process begins. Campaign planning as described in this paper is a workflow, anywhere on the spectrum of human managed to completely computer driven, for planning and/or booking media campaigns regardless of the distribution medium.

Again, using traditional linear sales channels as an example, the workflow may involve a planner working directly with a national agency or advertiser to plan and price a request for proposal (RFP) or it could be a real-time bidding (RTB) solution where advertisers and agencies compete through an exchange to secure the inventory, they need to fulfill their campaigns.

Regardless of the business model or degree of workflow automation, there are several critical pieces of information that should be known to understand if business can or should be taken during this process. First, simply knowing the inventory capacity is of primary concern to ensure that, absent any other information, a campaign should be able to be delivered. Next, understanding the ability to execute the campaign to ensure delivery is critical to understanding if contractual obligations can be met and is closely related to the inventory capacity itself.

The collection of the information mentioned and the answers to those business questions, precede the ability to even think about more strategic factors such as optimal pricing beyond a rate card or previous price based on an existing business relationship. Because of the challenges involved in accurately generating these answers, specifically in accurate forecasting, and creating feedback loops where knowledge about future delivery can help tune other forecasts such as future capacity, it's very typical that the end result of this planning process ends up as an exercise in, in-flight or post campaign stewardship once the business has already been taken.

Campaign Stewardship: Campaign stewardship is a process for ensuring a campaign is delivered with fidelity against contractual goals which are increasingly becoming a balancing act between reaching the correct eyeballs, at the correct frequency, at the correct times. This has traditionally meant ad sales analysts spend time reconciling contracts with delivery measurement to either correct a campaign in flight or in post to meet the contractual obligations. This process differs slightly based on the underlying business models (e.g. spot selling, impression selling, etc.), method of measurement (e.g. first party verification, third party verification), and billing rules (e.g. impression caps, threshold billing, etc.), but the same underlying goals are ever present.

An example of the in-flight campaign stewardship process might include looking at impression goals within a time-period, the actual delivery that should have occurred, the calculation of the difference between the goal and actual delivery, and the adjustment of future campaign time periods to realign the campaign if necessary. Most typically, because of a lack of accurate forecasting, this process is done a week at a time by simply carrying forward the liabilities.

Similarly, a post campaign stewardship process for any distribution might include looking at total contractual goals over the life of the campaign, aggregating measurement data, and if necessary, generating make goods or audience deficiency units (ADUs) to meet the contractual obligations. Like in-flight campaign stewardship, liability is carried forward.

This nature of stewardship by itself presents some challenges, but a few other glaring weaknesses are exposed when stewardship is managed in a silo without appropriate feedback loops into previously described processes.

The entire process of stewardship, encompassing both In-flight and post campaign stewardship, is a challenging enough problem to solve, trying to balance the management of revenue and liability, and increasingly more difficult as inventory pressures increase. A challenging hurdle to add to the stewardship problem, especially when third party measurement is involved, is the reconciliation between what the inventory capacity is thought to be, the delivery that actually occurs, and what the measurement service counts. Put differently, there is a required true up of what delivery is likely to occur, what delivery actually occurs, and what delivery can be counted towards campaign fulfillment or revenue.

One of the weaknesses of a siloed system, in particular one where capacity is forecast, is a lack of feedback to true-up the forecast. Future capacity is very closely related to potential delivery, particularly when viewers are the actual inventory. The capacity forecast is a representation of how many viewing events (impressions) of a particular set of characteristics are likely to see an ad in a future period. Without a feedback loop stemming from actual delivery, representing the actual viewers showing up, the capacity is never trued-up and there remains a gap between what inventory is thought to exist and what actually exists. This error manifests as either an under or over estimation of inventory which in turn can lead to added liability from campaigns that can't be fulfilled or lost opportunity costs from inventory that is never sold.

The last weakness of the siloed stewardship process discussed in this paper is related to the campaign planning process itself. As discussed previously, new campaigns being considered should be evaluated against what inventory is thought to exist and what delivery is likely to occur, however in most cases, both of those considerations are quite flexible. If a campaign is targeting a specific time period, then it is likely competing for the same viewers with other campaigns. Within the time period in focus, any combination of campaigns could consume the viewers and any combination of campaigns could carry forward some liability into other periods, given enough time. This flexibility of achieving campaign goals likely exists in the campaign being planned and, in most campaigns, that are in-flight over that same overlapping time period. This means that campaign stewardship can limit the ability to take new business in any given period of time and taking new business at any point in time can negatively impact or limit the ability to steward existing business to meet contractual obligations. Given how closely related these two processes are and how much each influences the other, they can be thought of as a single complex system, with the driving process being the campaign planning side.

Inventory Allocation: Inventory allocation is a process whereby each pool of inventory can be divided up and sold through different and often multiple sales channels with varying underlying business models. Depending upon the distribution models available, a traditional linear medium may be allocated into different sales channels such as national and varying geographic broadcasts, national and geographic addressable offerings, internal programmatic sales channels, or packaged off to a $3^{rd}$ party aggregator. Adding to that complexity, some allocations are rigid and cannot be retracted or expanded once the allocation is made, while others have the ability to be fluid. There are many factors that make the management of these allocations very complex, but the following three factors in particular stand out:

First, in the case of inventory itself, there oftentimes isn't an accurate picture of inventory capacities in the future. This is especially true when talking about targeted inventory as inventory capacity is based on actual viewer watching patterns, affiliation to segments, and the actual delivery to determine remaining inventory.

Next, sales forecasting per sales channel and inventory pool is typically lacking. Without this information, it becomes difficult to predict the likely inventory needed in the future before the allocation is made.

Lastly, the inventory itself has typically not been given a proper valuation which even with perfect insight into the first two problems leads to allocation decisions that may be sub-optimal in terms of revenue.

These factors all contribute to an allocation of inventory that falls somewhere on the spectrum of optimality that is presented to a sales channel.

Rate Management: Rate management as a process has historically been driven on historical bookings. Most groups start with the last price they gave an advertiser and work towards a price justification model. Rate cards are trued up generally on a quarterly basis and depending on the sales model (e.g. local, national, upfront, scatter, etc.) may be adjusted by an individual sales manager, based on their intuition. Most groups have not taken a holistic view at rate management beyond having the view that certain placements and audiences are in higher demand and should be worth more. In general, the lowest valued remnant inventory is given the most pricing treatment when it's sold through an exchange that has some form of yield management processes built into the SSP solution.

Billing: Billing historically has been anything but aggregated from the media seller's perspective. Multi-part deals that have digital and linear components or multiple linear components have historically been planned, stewarded, and then billed as individual orders.

Analytics Platform: An analytics platform is adapted to uniquely integrate the buying/selling, and associated planning processes that traditionally bisect the supply chain to enable frictionless trading which eliminates the intermediate and often unnecessary technology and processes between buyers and sellers. This in turn creates a simple solution for advertisers and agencies to plan and acquire advertising inventory to power their advertising campaigns at the greatest ROI from one or many media sellers at the same time and provides individual media sellers/distributors a simple solution for faithfully delivering the agreed upon advertising campaign at the greatest revenue, lowest liability, and lowest cost to them. This process is known as frictionless trading.

Figure 2:
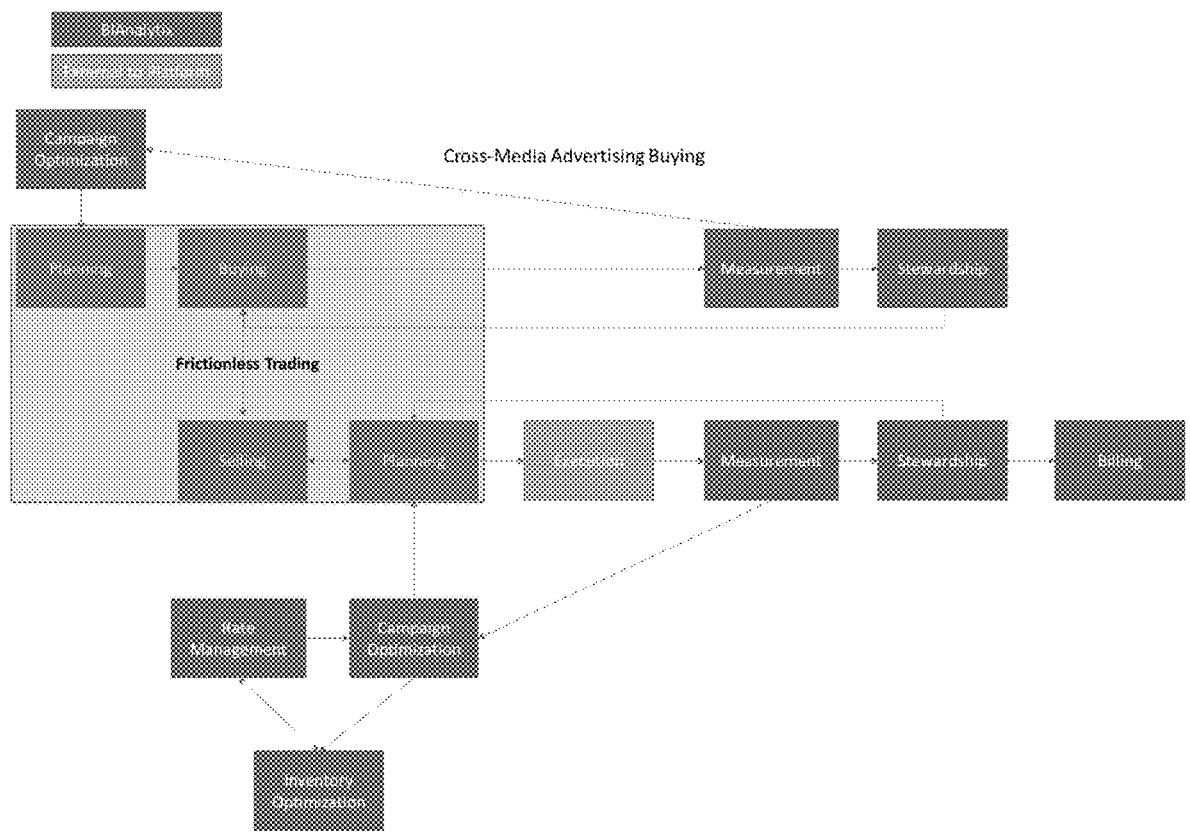
FIG. 2 is a block diagram showing an example implementation of a frictionless trading platform.

Frictionless Trading: FIG. 2 is a block diagram showing an example implementation of a frictionless trading platform. As described herein, frictionless trading refers to the ability to remove barriers from a Buyer's ability to purchase a Seller's advertising inventory. These barriers could be technology driven or human processes that not only draw the process out but may introduce insidious agents that diminish purchasing power or margin along the way. The analytics platform supplies a front end that uniquely provides interfaces to allow the buyer, planning and buying, and seller, selling and planning processes to be consolidated into a single process. This process in essence allows buyer's to plan a campaign based on their campaign goals and purchase inventory in a direct sale or bid from a private marketplace, across all distribution mediums, constrained to the inventory made available by the seller, and then allows the seller to gain any competitive advantage by using their inventory in the most efficient way possible to execute the campaign.

Figure 3:
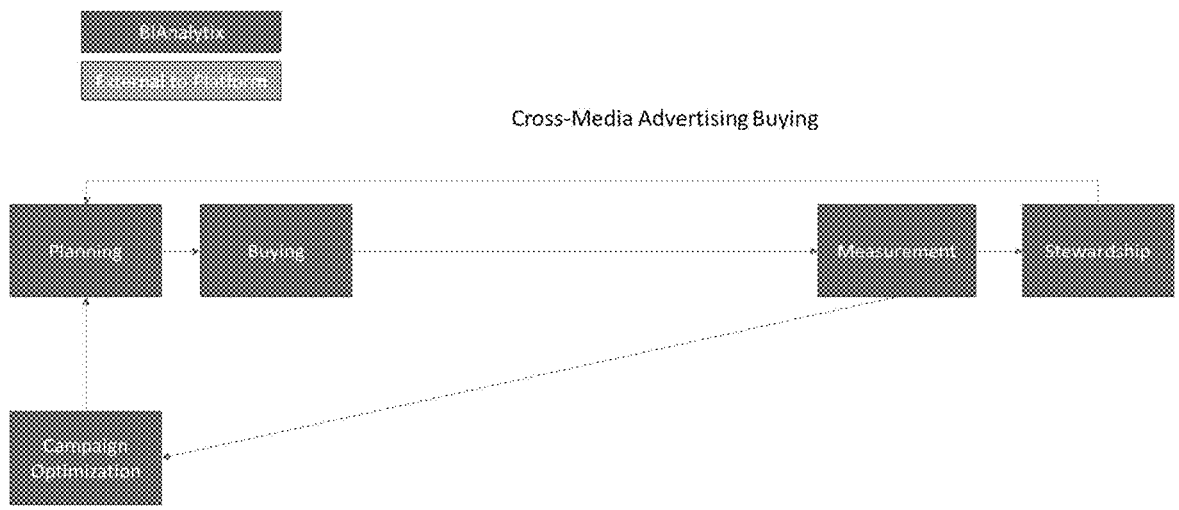
FIG. 3 is a block diagram showing an example of a buyer-side of an artificial intelligence analytics platform.

Buyer Supply Chain: FIG. 3 is a block diagram showing an example of a buyer-side of an artificial intelligence analytics platform. Focusing in on the Buyer side of the supply chain, the analytics platform provides several traditionally siloed functions in a single holistic process. Uniquely, the analytics platform creates a workflow on the buy side portion of the supply chain applicable to internal promotional and external marketing functions that occur for every advertising seller and distributor as well.

Planning, Buying, and Stewardship: An analytics platform can be adapted to provide the buyer with a planning and buying process fulfilled through the analytics platform that allows buyers to create media plans based on advertising goals, determine appropriate media mix, target audience, and exposure parameters. Stewardship is a natural byproduct of measurement.

The marketing strategy and research that culminate into what should be purchased is part of the planning process and determines what media should be purchased to deliver those messages. In this sense media planning and buying become an integrated process with marketing strategy and research. Based on the needs of the strategy, the advertising campaigns can be constructed within a media planning tool.

Those campaigns ultimately become requests for inventory from an external media vendor (e.g. digital publishers, national cable networks, broadcasters, MVPDs, etc.) or internally from a media organization's own advertising inventory.

The media planning process uses budgets, timeframes, target audiences, and platforms to try to acquire inventory from the various distribution partners. The planning system optimizes this to find the combination of distribution platforms that will best deliver the message to the target audience, within the budget constraints, while adhering to the other campaign parameters.

Figure 4:
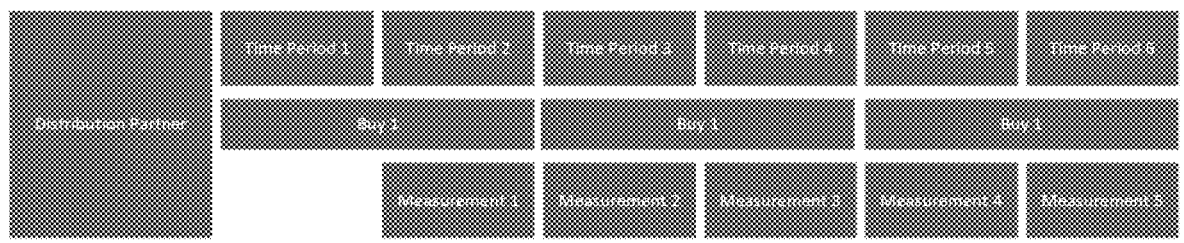
FIG. 4 is a block diagram showing an example of an artificial intelligence analytics platform.

As depicted in FIG. 4, the system plans an entire campaign over time, but in this particular example only buys two cycles ahead of measurement feedback loops to provide the system a mechanism for course correction/stewardship through conversion modeling described later.

Creative and Viewer Alignment: It has been said that 80% of the effectiveness of a campaign is the creative, which is intuitive since the creative is the advertising message. Ensuring that the target audience can be broken down into granular psychographic and cultural attributes would help ensure that creative could be designed that appeals to different types of viewers within a broader target audience.

Frequency and Separation: Research data suggests that exposure, typically in the form of frequency and separation are critical to increasing resonance. Research would suggest that like creative, different exposures rates, may be necessary depending on where a consumer is at in the sales funnel, what platforms they are on, and other factors to produce the desired conversion. This information along with budget will ultimately determine goals in the future and impact the buy. An analytics platform can analyze return paths to determine the most effective exposure rates across platforms, messages, audiences, etc. to help adjust future buys to drive better campaign ROI.

Target Audience: On the planning side, a media buyer understands the target audience for the brand or product better than any seller. Decades of research in psychology and consumer behavior have given advertisers insight into who their target audiences should be based on what they, as the advertiser, are trying to achieve.

The target audience should be as well defined as possible internally to entail:
 The individual viewers or the list of behavioral or psychographic attributes that define the viewers;
 The devices the viewer consumes content on;
 The geography of the viewer;
 As much external data about where the audience might reside within content as possible;
 Excluding viewers who are likely to consume content that doesn't align to your brand.

An analytics platform can be adapted to help determine improved or optimal target audiences by again analyzing return paths, but more importantly decomposing the known viewers into interesting attributes available through owned or $3^{rd}$ party data sets to better identify the common attributes of the audiences.

Campaign Optimization: Media planning for a brand should be done holistically, looking at all levels of the traditional sales funnel, but with a goal of constructing advertising campaigns that drive consumers towards an end goal. Knowing this, a buyer should be able to construct a single campaign for a brand that focuses on the target audience(s), platforms, and time periods that capture and retain consumers. Media planning in this context embodies the research process that fuels media planning decisions. BIAnalytix can aid in the campaign optimization processes by giving buyer's predictable delivery forecasts that are used to optimize the media mix, media buy, and stewardship of the campaign.

Performance Forecast: Unique to the BIAnalytix Platform, buyers using a filtered inventory view from the seller have the ability to view campaign delivery forecasts during the planning phase.

Improvement/Optimization

Promotional Mix: Recent market research suggests a 50/50 strategic marketing split between awareness and conversion is ideal and this is the recommended starting point of budget allocation. Only through feedback loops and tight marketing/research integration, described later, should these splits be adjusted. This system assumes that brand awareness and direct conversion campaigns have a synergistic effect and may rely upon each other to drive behavior so it's less important to focus on the mix, but the combinations of messages that drive consumers down the sales funnel.

Figure 5:
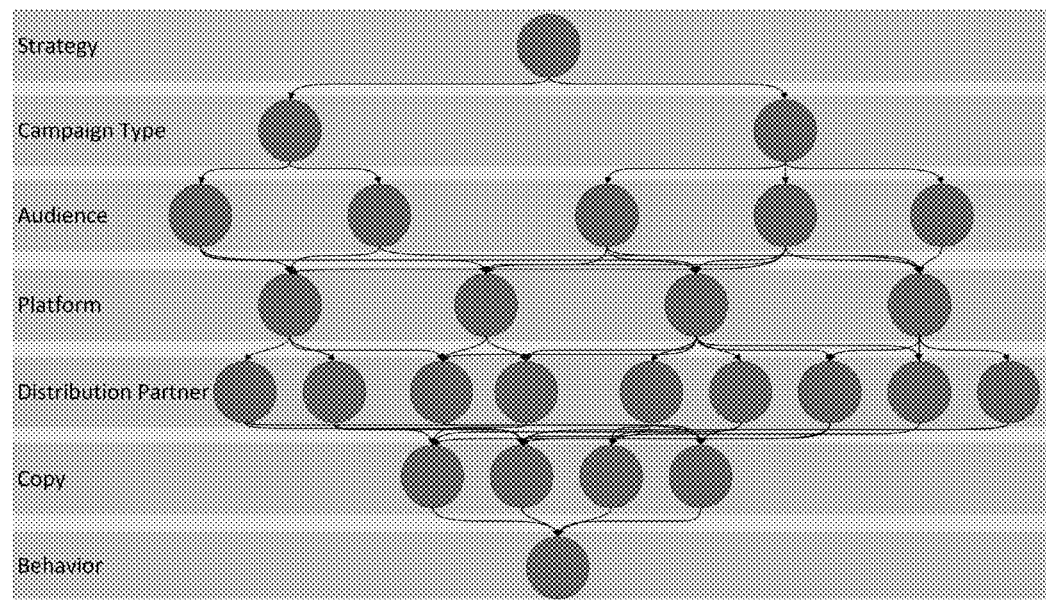
FIG. 5 is a diagram showing an example of an artificial intelligence analytics model comprises a plurality of layers form that can be formed into what is classically considered an attribution model.

Media planning sits on the pillars of strategy and research, constrained by budgets. In this workflow, marketing determines the strategy for achieving a specific behavior. Research determines who, where, when, and how viewers should be reached to drive those behaviors. Budgets constrain the ability to deliver the most effective campaign. The diagram shown in FIG. 5 shows how a plurality of layers form into what is classically considered an attribution model.

Marketing and research form the starting position of the campaign believed to best achieve goals. The rest of the workflow supports the placement, delivery, and modeling that create feedback loops for measuring the effectiveness of a campaign, but more importantly the effectiveness of various paths that form the basis of stewardship.

An analytics platform is adapted to analyze each conversion path as part of the entire strategy in addition to trying to determine how particular layer of the strategy is performing to overall success.

Media Mix: Understanding historically, where conversions (e.g. drivers of campaign success) have occurred by message, platform, and audience dictate the initial media-mix during the planning phase. This forms the basis for how the campaign should be constructed based on historical performance. An analytics platform can be adapted to model those conversion to determine the most effective and structure a recommended overall plan and initial buy.

Copy Integration: The ad copy itself that ultimately contains the advertising message has critical components that help better refine the media buy. An analytics module is adapted to ingest the copy metadata by allowing end users to attach during the planning process. Within this metadata are instructions as well as natural constraints that may limit where a message can air.

If the ad copy is already tagged with attributes such as character traits, these attributes can also be attached to the underlying audience segment to refine the target and better align the message to the audience.

Media Buy: While planning is done holistically, the campaign should be as fragmented as possible in appearance to the sellers. Pricing has historically been driven on past relationships and spend, but sellers are quickly moving to more demand driving pricing models that eliminate that relationship. In one embodiment, for example, what is needed to drive an effective campaign with a solid ROI should be known internally, but shrouded from the media seller. The target audience and timeframe should be defined only to the extent that the seller can execute, as these are critical drivers in today's rate card construction. This directly relates to how a campaign should be purchased.

In one implementation, some keys to obfuscation would be the following:
 Shop one platform at a time
 Shop just ahead of feedback loops in terms of time
 Shop for a variety of inventory packages that are equivalent to the actual audience
 Define audiences with brand safety in mind, don't rely on the seller Obfuscating in Aggregate: It may be possible at times to buy blocks of inventory that can be decomposed into many targets for many advertiser campaigns. By obfuscating in target, an agency could essentially buy in bulk and then carve up the inventory as it makes sense.

Obfuscating the Target: Whenever possible, this should simply be presented as a custom list to the media sellers.

Additionally, or perhaps alternatively, defining attributes of the audience may also be defined in copy classification and basic exclusionary rules. For example, instead of defining an audience directly, it makes more sense to define exclusions or rules that would naturally filter out audiences that don't make up the actual target segment.

For example, if Viacom properties were being targeted with the intent of buying Women 18-54, with Income X, and Education Y, and Attribute Z, a custom list of viewers that are Income X, Education Y, and attribute Z, but exclude Spike and Nickelodeon and dayparts outside of daytime could achieve the same target audience through exclusions. This could potentially provide a better rate because most sellers price based on list size. This will especially be true as the sellers promise to provide a service across all their platforms.

By obfuscating the type of viewers, the buyer can hide their intent to some degree, making it more difficult for sellers to determine if the purpose of the campaign is immediate conversion, brand awareness, etc.

Obfuscating the Flight: On the planning side, the flight itself may be aligned with budget goals of the advertiser, how they want to spend money over their fiscal year for a brand or product, which may align to some revenue goals. Media sellers use the flight information to figure out demand pressure to determine future pricing therefore it would be advantageous to potentially only buy a week or two at a time.

Similar to the audience, this may be packaged into different combinations for different sellers along with an audience to find an optimal price.

Randomization Strategy: In auction models, BIAnalytix protects buyer's interests by ensuring that bidding can be randomized to an extent to avoid pattern detection. Sophisticated auction systems learn bidding patterns to predict what price a buyer may be willing to purchase at. By randomizing bids within a threshold, the utility of the buyer is obfuscated from intelligent learning systems.

Stewardship: In the buying side of the supply chain, stewardship is the processes of adjusting the media buy based on the ROI of the campaign. BIAnalytix dynamically stewards the campaign based on the goal of maximizing the ROI. As the system learns from the incoming sales data, the platform optimizes the media mix and segment mix to maximize the overall campaign performance in the next buy cycle.

Actual sales, unit shipments, or consumer behavior (e.g. duration of viewing, engagement, etc.) represent a metric of direct conversion, which is the ideal mechanism stewardship, as it relates directly to the measurement of campaign ROI.

Alternatively, if direct sales are not an obtainable data source, an obfuscated proxy model is created by converting the sales to a 100% scale which provides an excellent alternative for stewardship purposes.

Figure 6:
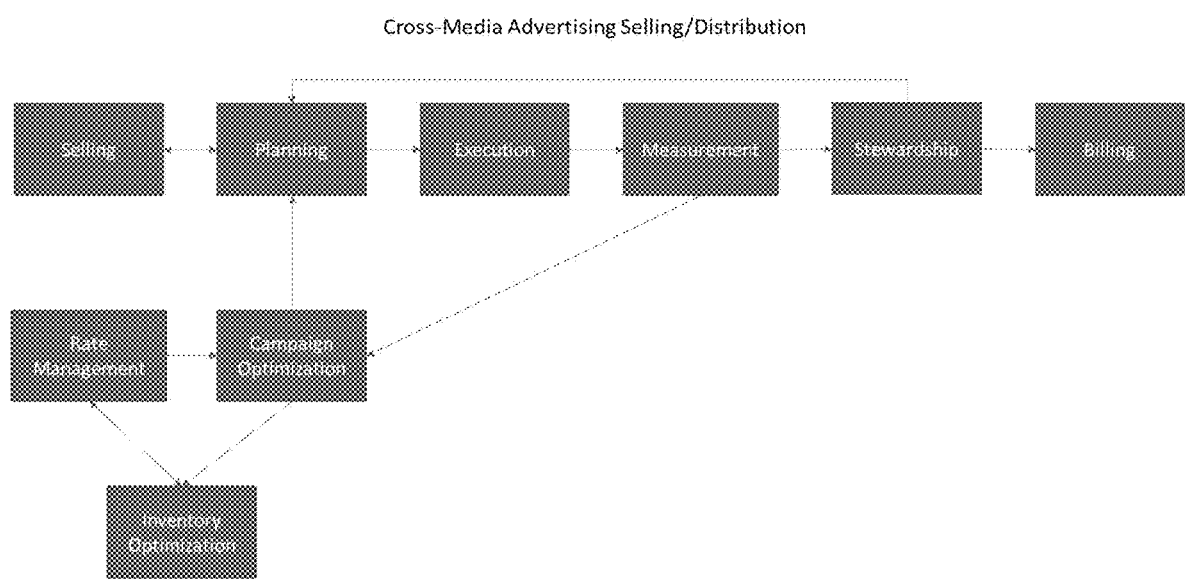
FIG. 6 is a block diagram showing an example module of an advertising selling/distribution supply chain module of an artificial intelligence analytics platform that is adapted to provide a plurality of core functions of the module.

Seller Supply Chain: FIG. 6 is a block diagram showing an example of an advertising selling/distribution supply chain module of an artificial intelligence analytics platform that is adapted to provide a plurality of core functions of the module. In this particular example, the module, for example, may comprises selling, planning, execution, measurement, stewardship and billing functions. The module can further include rate management, campaign improvement/optimization, and inventory improvement/optimization modules.

An analytics platform comprises application front-ends that streamline the operational workflows of the selling, planning, and billing processes. These front-ends are powered by backend services that optimize the execution of advertising campaigns and generate unified invoices for billing. The full complement of applications and services work together to optimize the seller's supply chain.

These services are underpinned with business context, including known inventory constraints, copy restrictions, and operational mechanics of the ad delivery systems. Using this information, BIAnalytix can objectively evaluate the cost/benefit of a campaign by comparing the estimated liability generated in the form contractual under delivery, the liability created by causing other campaigns to under deliver, and the lost opportunity cost generated by over delivery, with the revenue that can be obtained from the campaign. These metrics form the relative yield of the inventory to be committed to the campaign should the proposal be accepted, and can help drive decisions that avoid overbooking, mispricing, and eroding the value of the seller's inventory.

Selling, Planning, and Stewardship: The selling and planning processes may be independent or converged roles depending on the media seller. The BIAnalytix Platform offers a unified application that can be optionally used to combine the selling and planning processes into a single process. Combining the two processes enables frictionless trading. Frictionless trading on the sell side equates to decreasing the time necessary to close deals by providing the sales team with direct access to the rules that planning uses to plan and steward campaigns.

Copy Integration: Unique to BIAnalytix, the platform integrates the copy rules into the booking process regardless of the distribution platform. This creates a transparency of placement rules between the buyer and seller, ensuring that the buyer knows the criteria for placement and the seller protects their inventory value by ensuring the copy provides full coverage of the audience they are intending to target. This has the added benefit of refining the inventory consumption and demand based on the rules that copy should adhere to (e.g. FCC, brand clash, etc.). By integrating the copy rules at this level, the seller can more confidently provide a guarantee of brand safety across all of their mediums.

Figure 7:
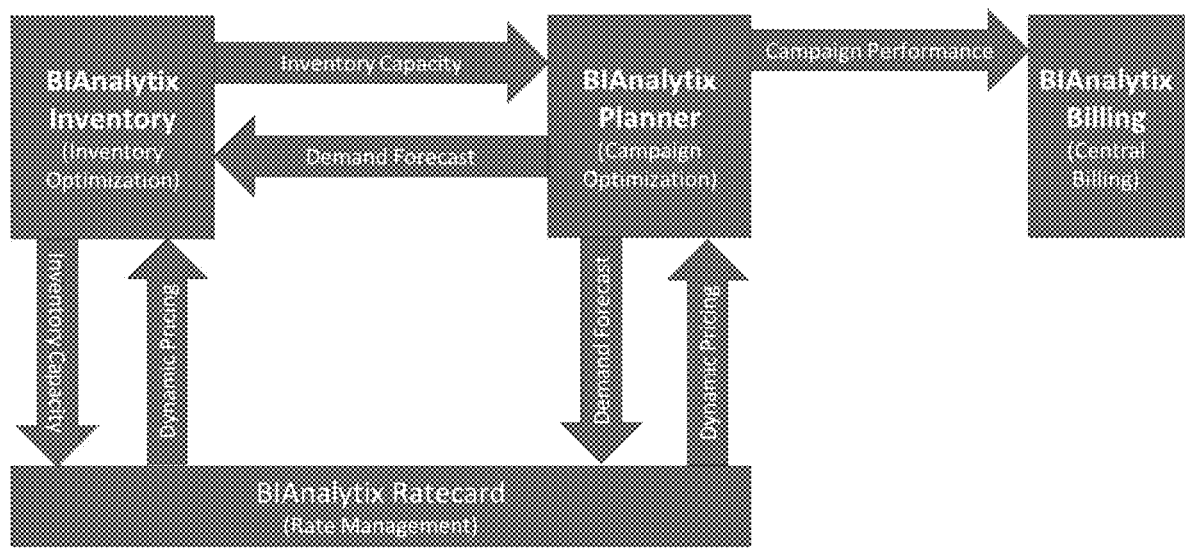
FIG. 7 is a block diagram showing an example module of an artificial intelligence analytics platform that is adapted to enable sellers to plan the execution of proposed campaigns using a holistic view of their business

Consolidated Processes: FIG. 7 is a block diagram showing an analytics platform (in this diagram referred to as a BiAnalytix Module) that is adapted to enable sellers to plan the execution of proposed campaigns using a holistic view of their business. In this example, the analytics platform comprises an inventory module, a planner module, a billing module, and a ratecard module. The analytics module, for example, may be adapted to provide the ability to forecast campaign delivery, determine optimal placement with consideration to other contracts that have already been executed, and leverage dynamic stewardship to ensure that all campaigns continue to perform according to contractual obligations throughout the life of the campaign. These processes of selling, planning, and stewardship are fulfilled by the three core services that interact with each other within the analytics platform.

Campaign Optimization: Campaign optimization is the process of dividing the seller's available inventory among all campaigns in a way that maximizes revenue. Because a seller's inventory is limited, and many separate campaigns can compete to use the same inventory, the tradeoffs of committing inventory to one campaign in lieu of another campaign can be evaluated. For example, committing inventory to a campaign with a low CPM when another campaign desires the same inventory for a higher CPM will result in a loss of revenue equal to the difference between the two campaigns. In addition to these superficial comparisons, the complex interrelation of competition and cannibalization among campaigns requires deep analysis of all potential planning and stewardship scenarios. The campaign optimization service uses proprietary artificial intelligence technology to recommend the optimal scenario that results in minimal liability and maximum revenue. The service provides an inventory demand forecast based on the optimal scenario to the rate management and inventory optimization services.

Demand Forecast: An analytics platform can be adapted to forecast the inventory demand based on the direct demand from campaigns that have been booked, indirect demand based on any overlap that may exist between inventory pools, and future demand based on historical trends and planned budgets. The demand forecast represents the amount of inventory demand by product category, which can be compared to a forecast of supply based on current inventory allocations. This information is passed to the Inventory Optimization service as the basis for the inventory optimization process.

Ad Copy Integration: During the campaign optimization processes, the ad copy requirement instructions are integrated into the planning processes to ensure that the placement opportunities are aligned with the instructions themselves. This has the effect of ensuring copy rules that may impact legal regulations or brand safety constraints are followed.

Campaign Optimization in a Cross-Media Ecosystem: Campaign optimization in a cross-media ecosystem entails two levels: the first considers how a cross-media campaign's impression goal can be divided between platforms (Mobile, Digital Video, etc.) based on availability of the target viewers in each platform, and the second considers how the best set of delivery instructions for each specific platform can be constructed to deliver the goal set within each platform.

Global Cross-Media Optimization: The first level of optimization, global cross-media optimization, determines the appropriate mix of impressions across platforms based on the contractual obligation, existing business commitments, and the inventory available within each channel.

The analytics platform can be adapted to uniquely handle contract constraints that limit the placement opportunities for a campaign. These constraints, in some implementations, include the following:

Percent of impressions that must/can be delivered for a particular or intersection of:
Platform
Target Segment
Ad Copy
Time period (e.g. quarter, month, week, day, hour, etc.)
Inclusions or Exclusions:
Platforms
Geography
Classification related to ad copy requirements or instructions used to implement brand safety or alignment to legal rules
Date Ranges
Networks, Channels, or Stations depending on the media business model
Programs
Dayparts
Time Ranges
Other qualifiers including:
Separation
Household Frequency Global Platform Specific Optimization: Once the optimal mix of platforms has been selected, platform specific optimization takes the above constraints into account specifically in context of delivery within the platform itself. This takes into consideration how the campaign can be best delivered within that platform with respect to the campaign's:
Target Segment
Ad Copy
Time period (e.g. quarter, month, week, day, hour, etc.)

This second stage of optimization results in an improved or optimal set of delivery instructions for the downstream delivery system to achieve the desired impression target.

This involves producing recommend settings for common parameters that can be used to control the pacing of delivery, specifically frequency cap and separation.

Insertion Priority Optimization: When interfacing with platforms that have downstream delivery systems which can obey the delivery instructions precisely and have the proper feedback channels to monitor delivery in real-time (such as web-based ad servers), the analytics platform can be adapted to uniquely supply the insertion priority. This insertion method is determined by analyzing the inventory pressure to determine the appropriate insertion model. The insertion priority is created using a fractional knapsack solver that uses a sorting method based on the level of inventory pressure. The two ranking models that are dynamically chosen are:

CPM Ranked—ranking order lines by highest to lowest CPM

Consumption Ranked—ranking lines in order of lowest to highest inventory total inventory (impression) consumption. Total impressions are calculated by summing the needed/desired impressions for that line with the overlapping impressions across all other lines that would result in a capacity decrement for each target segment.

Inventory Improvement/Optimization: The Inventory Improvement/Optimization service can be adapted to allocate inventory between sales channels to the extent that they share the same underlying inventory. The service does this by first consuming a forecast of impression demand from the Campaign Improvement/Optimization Service. Then, it evaluates how each ad insertion opportunity helps to fulfill the forecasted demand if it were allocated to each sales channel. The definition of an ad insertion opportunity depends on the targeted platform: for video content, ad insertion opportunities are scheduled breaks (whether in a broadcast schedule or an encoded video file); for web advertising, an ad insertion opportunity could be a banner, pre-roll, etc. Evaluating an ad insertion opportunity takes in to consideration how much capacity the opportunity is expected to provide to the sales channel, how well the opportunity can be monetized based on its audience valuation and targetability, and if there are any business rules in place that would restrict the opportunity from being allocated to a particular sales channel. Ultimately, each opportunity is allocated to the sales channel in which it receives the best score from the evaluation. The service feeds the optimized capacity to both the campaign optimization service and the rate management service.

In order to optimize inventory allocations, it's necessary to answer four key questions:

When will viewers be present?

Who are the viewers present at a given time and what can they be targeted by?

How much are the viewers worth?

How much demand is there?

Viewer Behavior: The first question to be answered is "when will viewers be present?". It's necessary to forecast the capacity, or the total amount of viewing activity for each viewer over the timeframe in which the allocation is being evaluated (e.g. a broadcast quarter). It's also necessary to build an expectation for what times of day each viewer can be expected to be viewing (e.g. from 18:00 to 20:30, etc.). Viewer behavior, whether stemming from first-party or third-party observations, forms the basis for both the capacity forecast and the audience valuation.

Figure 8:
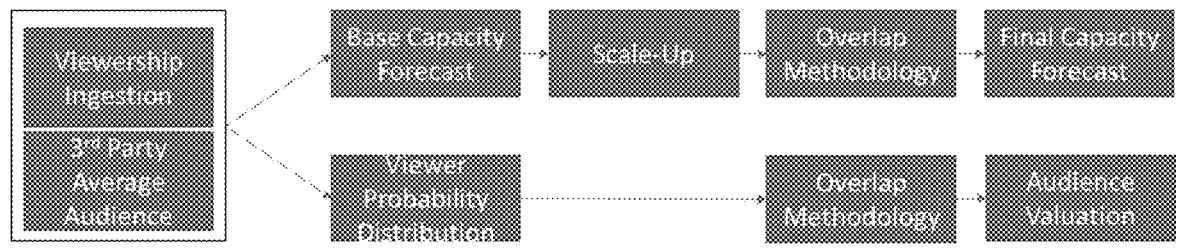
FIG. 8 is a block diagram showing an example module of an artificial intelligence analytics platform showing a capacity forecast module.

Capacity Forecast: FIG. 8 is a block diagram showing an example module of an artificial intelligence analytics platform showing a capacity forecast module. In various implementations, for example, capacity forecasts used by an analytics platform can be produced for each time period (e.g. a week) and each target segment (e.g. luxury auto intenders) defined by the business. In platforms where individual viewers can be measured, each viewer's raw viewing events are counted and aggregated into the relevant time periods. Next, the viewer's periodic impression capacity is mapped to the segments in which the viewer is an active member. The impressions are summed by segment resulting in historical periodic impression capacities for each segment. Using a combination of time-series forecasting and seasonal decomposition methods over the historical data, forecasts of the future impression capacity for each segment out to a given time horizon (e.g. the next 30 weeks) are produced.

In platforms where individual viewers cannot be measured (such as linear broadcast platforms), the preprocessing and aggregating of viewers into segments is not necessary. The historical periodic impression capacities for each segment are simply collected from a measurement service (such as Nielsen or Rentrak). Using a combination of time-series forecasting and seasonal decomposition methods over the historical data, forecasts of the future impression capacity for each segment out to a given time horizon (e.g. the next 30 weeks) are produced.

Viewership Scaling: In platforms where the Inventory Optimization Service has access to viewer-level data, it may be necessary to interpolate some viewer data is not all of the platform's viewers are directly measurable. This tends to arise in addressable platforms in which not all set-top box hardware in the field has an active backchannel to the seller. Since there will never be records for viewers that do not report viewing events, capacity in these platforms will be underrepresented. BIAnalytix applies proportional scaling to the historical weekly impression capacities after aggregating the viewer events into segments to rectify this shortcoming. Once the future viewer impression capacities have been produced, a simple sum of all the impression capacities will yield the unscaled "all viewer" capacity. The count of viewer records is compared to the known population size, and the proportional difference between the two is applied to the unscaled "all viewer" capacity. For example, if 20% of the viewer population is unable to report viewing events, the unscaled "all viewer" impressions will be increased by 20% to compensate. The difference between the scaled and unscaled capacity is the forecasted impressions that will be lost due to the lack of feedback loop. That difference can be assigned to a single "phantom viewer" record, which will be treated like all other viewers in the follow-on calculations. Alternatively, a distribution can be constructed using the observed impressions per viewer, and the distribution could be used to randomly assign the "phantom impressions" to the non-reporting viewer records.

Viewer Probability Distribution: With the future viewer impression capacity forecasted, the next step is to stretch the capacity over the allocation time dimension. For the sake of example, assume that break allocations are made in quarter-hour increments. If a different granularity is used (e.g. daypart), the same methodology can be followed. This is used to determine how much capacity will be acquired by allocating a given break to addressable. To do this, a probability distribution is generated for each viewer that will show the probability that the viewer is present during a given quarter hour. All of the viewer's historical viewing records are counted and aggregated by quarter hour, then divided by the viewer's total historical impressions across all time. This distribution shows the broad behavioral patterns of the viewer—for example, if the viewer was always watching around 18:00, the probability that the viewer will be watching at 18:00 sometime in the future will be relatively higher than other times. This is known as a viewer's probability density vector. The probability density for each viewer is multiplied by their forecasted impression capacity to give the viewer's forecasted impression capacity by quarter hour. For example, if the viewer has a total of 100 impressions forecasted for the next quarter, and the viewer has a 20% probability of viewing at 18:00, the viewer's expected contribution to the impression capacity for the next quarter at 18:00 will be 20 impressions. These vectors can be summed across all viewers to yield a quarter-hour average audience for addressable. In the event that a quarter hour has never had an addressable break allocated to it, and therefore has no history, the linear average audience could be scaled down to the addressable footprint size to estimate the capacity for that quarter hour. In platforms where viewer-level data is not available, the target segment is treated as a single "meta-viewer". The same methodology is followed to create a distribution for the complete segment.

Viewer Segments: The next question to be answered in this embodiment is "who are the viewers present at a given time and what can they be targeted by?". In an analytics platform, segment capacities are not mutually exclusive and non-additive.

Viewership Overlaps: The Inventory Optimization Service deals with the fact that individual viewers can be targeted by many overlapping campaigns. However, when allocation decisions are being made, it's unlikely that much if any business will be on the books for the future period. Therefore, it's not possible to know the exact future campaigns and segments that will target a particular viewer. Looking at viewers by product categories rather than specific target segments eliminates part of the problem, but product category memberships are also not mutually exclusive. If the problem is examined from a different angle, the goal appears to be to determine how many of the viewer's impressions will be delivered to a given product category. Similar to the way a probability distribution was produced for the periods of time the viewer will be watching, a distribution can also be created to build an expectation of what the viewer will be targeted by in the future. This is how the Inventory Optimization Service forecasts capacity for a future segment from a given ad insertion opportunity. First, all of a viewer's historical viewing events are mapped to the product category of the advertisement the viewing event was associated with, then the events are counted and aggregated by product category. Any product categories that don't have future demand forecasted for them are filtered out. Dividing the count of impressions by product type by the viewer's total impressions yields a probability that a future impression by the viewer is of a certain product type. This probability density vector is then be multiplied by the viewer's forecasted impression capacity to yield a mutually exclusive expected segment capacity per viewer.

Audience Valuation: The third question to be answered is "how much are viewers worth?". It's important to know this so an expectation can be made of how much a viewer's future impression can be sold for in each sales channel. To calculate the average value of a viewer in platforms where viewer-level data is available, the viewer's raw viewing events are mapped to the order line in order to get the CPMs of all the campaigns that the viewer was previously targeted by. The mean of the CPMs represents the "expected CPM" of the viewer's impressions; on average, future campaigns targeting this viewer will likely achieve approximately this rate. Multiplying this rate, divided by 1000, by the vector of quarter-hour capacities for the viewer yields the expected value that the viewer will contribute to that quarter-hour if the ad insertion opportunity is assigned to the inventory pool. The expected CPM can optionally be further refined by product category. In platforms where viewer-level data is not available, the expected CPM for the segment can be configured to either come from a prevailing rate using a fixed ratecard or demand-based rate forecasting methods such as the Rate Manager Service.

Third Party Audience Proxy Model: In the event that viewer level viewership data isn't available, an alternative model is used whereby a total all people capacity as reported by a third party audience measurement provider (e.g. Nielsen, comScore) is supplied for a designated break. That total capacity figure is then broken down into smaller capacities using conditional probability based on first or third party information that exists for similar breaks. This method would include using data from one platform that does have granular data collection, such as an OTT platform and using the conditional probabilities of viewership in like content to apply to a particular break where actual viewership doesn't exist at a granular level. Given that different platforms have different base demographics, particularly age, a general true up can be done as data is collected from the third party measurement party over time.

Optimization: Once the above preprocessing has occurred, it's possible to evaluate the value that can be generated by different allocation scenarios. Given the goals of inventory allocation, two "bad" outcomes that would lead to suboptimal results can be characterized: not allocating enough ad insertion opportunities to fulfill the forecasted demand for the inventory pool, and allocating an ad insertion opportunity to the inventory pool when it's possible to make more money from the same inventory in a different inventory pool (e.g. average unit rates are higher for linear in a specific quarter hour).

Since it's possible to calculate the value of each ad insertion opportunity via each sales channel using the data produced from the above process, it's possible to calculate how much money would be left on the table by making a "bad" allocation decision. An optimal allocation would be one that minimizes all money left on the table. However, converting ad insertion opportunities from one inventory pool to another creates a tradeoff. While converting inventory increases the supply and reduces the amount of unmet demand in the target inventory pool, it reduces supply which can result in cannibalizing business in the source inventory pool. Therefore, the optimal solution is one that balances these tradeoffs. The Inventory Optimization Service does this by finding the scenario that minimizes the sum of these two penalties subject to any constraints. Constraints are entirely defined by the business—an example of some possible constraints: a limit on the number of addressable ads per quarter hour; a requirement to have a minimum number of addressable spots in a specific daypart (e.g. prime); excluding a network or daypart; etc. The optimal scenario found by the Inventory Optimization Service forms the basis for the inventory capacity forecast.

Rate Management: The rate management component of BIAnalytix takes a holistic approach to rate management across all platforms by applying classic supply/demand economics to establish floor rates and then overlaying a utility-based model, specific to the buyer.

Floor rates: Starting with a reference point, such as a ratecard, a comparison between the reference rate and the prevailing rates of current and recent actual bookings is used to measure demand pressure. Demand pressure is measured in three different ways:

External to the organization, to establish competitive pricing
  Across sales channels to account for different ways inventory can be packaged
  Within a sales channel to account for direct or indirect competition for the under lying audience Those three measurements create anchors to frame the pricing strategy. Competitive pricing establishes an absolute marketplace floor while inter and intra sales channel demand establish price limits on specific inventory packages. The analytics platform considers the following principals to establish floor rates for any type of advertising inventory.

Future Pricing for "Upfront" Sales: It's not uncommon for media sellers, regardless of platform, to enter into contracts with buyers to deliver impressions sometime in the future. Buyers may plan their campaigns and media buys upwards of 6 months in the future. This opens sellers to the risk of price arbitrage, especially on inventory in heavy demand. For example, if the price for a target segment has been trending upwards for some time, the buyers would be rewarded for buying as many impressions as they can as soon as possible. If the buyer instead waited to purchase closer to the desired air-date, prices would have continued to climb making the campaign more expensive. An analytics platform can be adapted to use well-known contract pricing practices developed by the financial industry to protect inventory from these price arbitrage scenarios.

The premise for setting floor rates in BIAnalytix is to treat future bookings as forward contracts. A forward contract (also referred to as simply a "forward") is a well-understood class of derivative financial instruments in which an agreement is made to have a good or service delivered at a specified future time for a price agreed upon at the present time. Applying standard terminology to media sales, the "spot price" is the price an advertiser will pay for an audience delivered today (an ad unit booked and transmitted on the same day), and the "forward price" is the price an advertiser will pay for an audience delivered at a future transmission date. Therefore, as prices are adjusted periodically based on observed demand, the spot price includes the full history of demand-based pricing adjustments over the lifecycle of the inventory unit, and a forward price represents the fair-market valuation of a future ad unit based on all currently available demand information.

Regardless of when bookings are made, buyers derive the same value from the audience. That is, an audience delivers the same number of impressions to an advertiser regardless of whether the booking occurred six months prior to air or one day prior to air. Upfront sales are simply contracts with a longer "time-to-delivery" than scatter sales. Upfront bookings allow buyers to hedge against inventory scarcity (also called "convenience risk"), price volatility, and currency risk. For sellers, upfront sales hedge against revenue risk by putting a significant amount of revenue "on the books" ahead of time, but it also invites counterparty risk, such as the customer's lack of ability to pay in the future. Therefore, the forward price accounts for risks on both sides of the exchange. Accounting for these future risks forms the basis of "spot-forward parity". Spot-forward parity states that there should be no difference between buying the forward contract and taking delivery and waiting until the delivery date to buy at the spot price—therefore, the risks are appropriately "priced in" to the forward.

To arrive at an initial fair market value for the forward, an appropriate alternative is considered. Typically, this entails comparing a security that offers a risk-free rate of return, such as a Treasury bill. For example, a seller could sell some inventory today that will air in six months for $1000. The seller could then take the $1,000 and purchase a six-month Treasury bill at 1.02%. At the end of six months, when the inventory goes to air, the seller can sell the Treasury bill for $1,005.51 without taking on any additional risk. Therefore, one appropriate forward price for the inventory is $1,005.51 since the seller could make at least that much by selling the inventory today and investing at the risk-free rate. The risk-free return model is especially useful when a platform has not collected sufficient historical pricing data.

Instead of using the risk-free rate as a basis for valuation, the "internal rate of return" achieved by withholding sale of the inventory is used. With sufficient history of the inventory's periodic change in spot price, the analytics platform is adapted to calculate the inventory's inflation rate. The inflation rate is the average daily percent change in the inventory's spot price. This represents an expectation of price adjustments that will occur up to a future period in time. If the spot price for some inventory is $1,000 and the inflation rate for the inventory is 0.05% per day, the expected spot rate for the inventory in 180 days is $1,094.15. Therefore, an appropriate 180-day forward price for the inventory would be $1,094.15 since the seller could expect to make that much by withholding the inventory from sale for 180 days and then selling it at the spot rate. This relies on two assumptions: one, that there will be demand for the inventory on the air date, and two, that there is no material change in demand pressure or inflation over the time horizon. These assumptions may result in a forward price that exceeds what the market is initially willing to bear. However, the actual risk of overpricing when calculating the initial forward price is quite small. In the event the forward is mispriced, demand for the future inventory (or lack thereof), will signal a repricing action, at which point the analytics platform will reevaluate and adjust the price up or down as appropriate.

FIG. 9 is a graph showing an example of an upfront rate curve. In this example, on May 15, 2017, the analytics platform Price for the Monday-Friday 8-9 a ad unit was $350. Given the ad unit's average daily inflation of 0.05%, the initial forward prices for upfront sales in Q4 range between $425 for September 25 and $490 for December 25 at Priority 5.

Utility-Based Adjustments: On top of the floor rates set by the analytics platform, further premiums or discounts are set by the analytics platform to arrive at the final price based on market signals, competition, and buyer behavior. To manually assist in this process, the analytics platform can be adapted to offer a Price Assist feature that provides historical information about the advertiser and advertising agency to help the sellers better understand how past campaigns have been priced, performed, and to the degree possible, what the intent has been.

Supply/Demand Alignment: It is common in revenue management practice to oversell inventory to mitigate the effect of cancellations, mispricing, etc. The airline industry, for example, deliberately overbooks flights to ensure that their aircraft will not take off with any empty seats. Likewise, a media seller may desire to take on a degree of overbooking risk in attempt to minimize lost revenue from filling unsold inventory with promotional or other non-revenue-generating copy. An analytics platform can predict the final disposition of an inventory unit based on observed demand and buyer behavior and recommend actions such as repricing or temporarily discontinuing sales of inventory to react to market signals and minimize overbooking risk.

For platforms that use spot selling models, these predictions manifest in the probability that a spot booking at a certain price will not get pre-empted from its desired break position in a broadcast schedule. If the probability is higher than a certain threshold, this indicates that the proposed spot booking is priced below the expected value of the inventory and therefore will likely get replaced by a spot that values the inventory at a higher price. Conversely, a forecast displaying a high proportion of "filler" spots indicates that the market is not willing to bear the current price for the inventory, and prices should be decreased.

For platforms that use impression guarantee models, these predictions manifest in an impression-based demand forecast for the inventory. A demand forecast that exceeds the current supply indicates that the inventory is potentially underpriced. Conversely, a demand forecast that is less than the current supply indicates that the inventory may be underpriced.

In both models, BIAnalytix can be configured with the business's direct pricing rules, to ensure that the system will make pricing recommendation that fall in line with acceptable risk for the business. These rules can be imposed to limit the number of price changes over a given sales period, the size of each price change, restrictions on the maximum and minimum price the system is allowed to offer, and thresholds for when pricing changes should be made. For example, a rule might state that when demand exceeds supply by 10%, increase the price by 5% of the current price, no more than once per week, with a maximum possible price of 25% over the ratecard price.

Cannibalization from Competition: While increasing prices in the face of demand pressure maximizes marginal revenue generation, the contractual nature of campaigns still binds the media seller to provide customers with the agreed upon value. When a buyer signs a contract to purchase some future inventory while prices are low, if demand for that inventory persists and prices rise, contracts that book at the new higher price have the potential to displace the earlier contract. However, even if the buyer becomes priced out of the inventory, this doesn't relieve the seller of the obligation to provide the agreed upon impressions or spots. Underperforming contracts should be made good, which increases the carried-forward liability of the seller. This is a cannibalization effect that the analytics platform evaluates when recommending repricing actions. The liability or "harm" generated by the cannibalization effect is calculated by reforecasting the demand at the new price being evaluated, calculating the difference between that demand and the current supply availability, and subtracting the revenue from the future demand from the displaced revenue. Within the bounds of other configured pricing rules, the analytics platform can will recommend price changes that will maximize revenue while minimizing the liability generated by potential cannibalization.

Viewer-Based Valuation: The analytics platform pricing philosophy can be adapted to rest on a premise that advertisers ultimately derive perceived and/or actual value from an advertisement by virtue of viewers seeing the copy and having some sort of reaction to it (conversion, reinforcement, association, etc.) Therefore, the analytics platform pricing philosophy can be adapted to trend toward a viewer-based definition of demand.

This definition has a few key premises. First, and most importantly, is the premise that viewing is fundamentally a time-bound activity. That is, regardless of any meta-constructs used to label or group periods of time (such as a program, a daypart, a timeslot, etc.), all viewing can be reduced to the same dimension of time—minutes, hours, etc. This is very important for the second premise, which is that time influences the available audience and content influences the captured audience. That is, scheduling an NFL game in the middle of the workday is unlikely to entice many people to skip work or other obligations in order to view the content. Substantially more people are generally available to view any television programming in the evenings than in the middle of the day. However, content enables a media publisher to capture a larger share of the available audience at any given point in time, as better content will be more enticing than alternative content choices on other channels/media (OTT, etc.) and/or alternative leisure activities (video games, reading, etc.). Put simply, the premise is that content can be used to entice people to view if, and only if, television viewing is a viable and convenient activity for them. This leads to the third and final premise, that each "slice" of time has a relatively stable available audience. That is, viewers who regularly watch any television at 3:00 PM on weekdays will likely continue to be a part of the available audience in the future, as they have historically considered television viewing a viable and convenient activity at 3:00 PM. So long as the viewers continue to be part of the available audience, the only factor that will influence their viewing is if the content continues to be more enticing than any other alternative.

Patterns of demand in advertising can mimic this viewer behavior—demand (ergo prices) will be highest during peak hours for the available audience, and lowest during off-hours. It also follows that content will have a more significant mediation effect during peak hours, since media publishers, networks, etc. have an incentive to create more enticing/competitive content as there is a larger pool of available viewers to capture. New programs in these highly volatile timeslots can be challenging to price, as neither advertisers nor media publishers can predict how the content will perform. This may be dealt with in a number of ways: advertisers may take a "wait and see" approach to allow time for sufficient ratings data to be produced before choosing to purchase spots, advertisers may attempt to predict content performance based on hype or other factors, or the advertisers may opt to purchase spots on the chance that either the content will perform well or the potential audience is large enough that even a small share of impressions would be suitable for the advertisers needs. It's important to note that perception of value can be just as powerful of a demand driver as actual value.

This view of demand is key, because it enables a high degree of flexibility in modeling. By measuring demand first against time of day, the model is agnostic to past and future scheduling decisions. Therefore, the final model layers together the time-of-day effects on demand, the content effects on demand, and the interaction effects between time-of-day and content. The content effects include some significant metadata features about the content, such as content tags, if the content is new in the timeslot, and if the content is new to the business unit (such as a season/show premiere). The content metadata effects have demonstrated a statistically significant impact on demand and can be explained by having a mediating effect on captured audience.

By layering the time-based demand forecast against the time-based capacity forecasts generated by the analytics platform inventory, mismatches in alignment between supply and demand are identified, resulting in repricing recommendations.

Utility Driven Rates: As the floor rates move up and down, they can establish an organizational norm or average. Based on the utility that an individual buyer can gain through purchasing inventory; the rate is adjusted manually through buyer/seller relationships and negotiation. In a trading model where humans are not negotiating the buy, such as in an RTB scenario, the analytics platform can be adapted to perform a utility forecast for each individual buyer based on historical data pricing data points, intent (to which it can be measured), and estimates of product value in the case that it's known, or other proxy models that indicate their likely utility in an auction based scenario and adjust the offered price from the absolute floor. This has the effect of offering pricing to media buyers based on the value they apply to the advertising inventory, treating every pricing interaction as an auction model. The benefit of applying this utility adjusted rate dynamically is obvious with a small thought experiment. An advertiser with a high-value product such as Rolex would find more utility in hitting the 100 people most likely to buy a Rolex than an advertiser with lower-value product such as P&G, selling dish soap. Rolex stands to gain more even through a few conversions than P&G would, suggesting that there is more utility and acceptance of a premium to obtain that utility for the high-value product owner.

Billing: An analytics platform can be adapted to uniquely aggregate data into the platform to support aggregate billing for any system integrated. As show below, the analytics platform can support a multitude of integration sources and then provides a variety of Billing related functions including the following:

Invoicing
Reporting
Affiliate Management
GL Postings
AR Postings

Data Aggregation: FIG. 10 is a block diagram showing an example module of an artificial intelligence analytics platform. In this example an analytics platform can be adapted to aggregate data from multiple sources of record, such as but not limited to CRM, traffic and billing, delivery, and other sources of billing information used to generate a master invoice. The data can be aggregated according to billing rules that determine the top-level aggregation at the campaign, advertiser, or agency level, and then the periodicity such as a calendar or broadcast month.

Data Unification: Aggregated data is unified to a master record based on billing rules, which can be campaign based or advertiser based.

Figure 11:
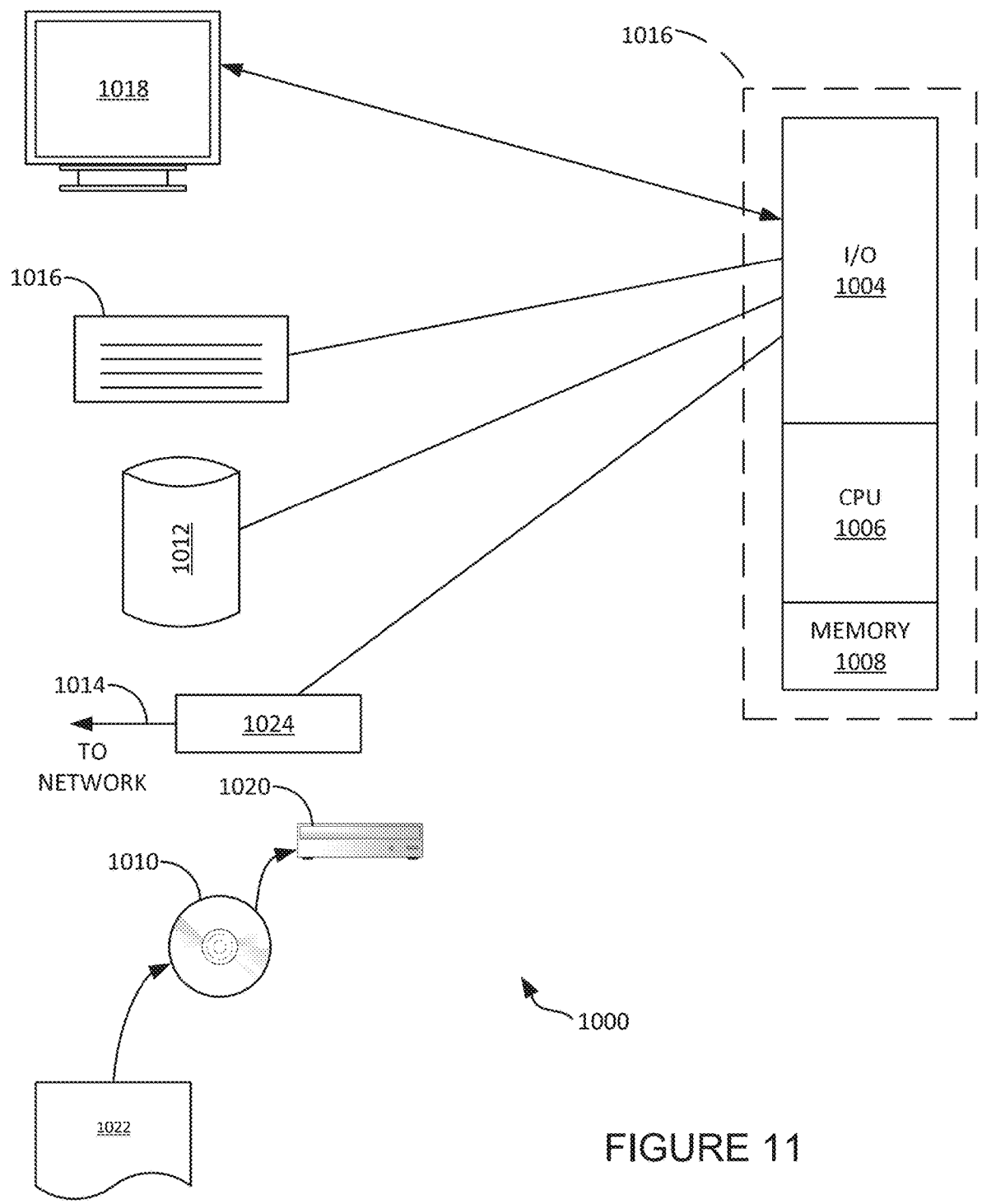
FIG. 11 illustrates an exemplary system useful in implementations of the described technology.

Application of Business Logic: As data is aggregated and unified it is done so by applying business logic necessary to report back to the original buyer based on what was ordered. Ensuring that the transmitted details are aggregated and unified in a manner that reflect the original order is critical. The following types of logic are applied:

Bookend rules
Headend/Syscode/Zone rules
Air Time
Schedule Time
Taxes
Adjustment
Ad Copy Rules
Spot Rate Rules
AE Ownership
Network Orbits
Roadblocks
Impression splitting by GL
Custom calendar billing
Custom geo mapping
Billing profiles commissions FIG. 11 illustrates an exemplary system useful in implementations of the described technology. A general purpose computer system 1000 is capable of executing a computer program product to execute a computer process. Data and program files may be input to the computer system 1000, which reads the files and executes the programs therein. Some of the elements of a general purpose computer system 1000 are shown in FIG. 11 wherein a processor 1002 is shown having an input/output (I/O) section 1004, a Central Processing Unit (CPU) 1006, and a memory section 1008. There may be one or more processors 1002, such that the processor 1002 of the computer system 1000 comprises a single central-processing unit 1006, or a plurality of processing units, commonly referred to as a parallel processing environment. The computer system 1000 may be a conventional computer, a distributed computer, or any other type of computer. The described technology is optionally implemented in software devices loaded in memory 1008, stored on a configured DVD/CD-ROM 1010 or storage unit 1012, and/or communicated via a wired or wireless network link 1014 on a carrier signal, thereby transforming the computer system 1000 in FIG. 11 into a special purpose machine for implementing the described operations.

The I/O section 1004 is connected to one or more user-interface devices (e.g., a keyboard 1016 and a display unit 1018), a disk storage unit 1012, and a disk drive unit 1020. Generally, in contemporary systems, the disk drive unit 1020 is a DVD/CD-ROM drive unit capable of reading the DVD/CD-ROM medium 1010, which typically contains programs and data 1022. Computer program products containing mechanisms to effectuate the systems and methods in accordance with the described technology may reside in the memory section 1008, on a disk storage unit 1012, on the DVD/CD-ROM medium 1010 or other non-transitory data storage medium of such a system 1000. Alternatively, a disk drive unit 1020 may be replaced or supplemented by a floppy drive unit, a tape drive unit, or other non-transitory storage medium drive unit. The network adapter 1024 is capable of connecting the computer system to a network via the network link 1014, through which the computer system can receive instructions and data embodied in a carrier wave. Examples of such systems include SPARC systems offered by Sun Microsystems, Inc., personal computers offered by Dell Corporation and by other manufacturers of Intel-compatible personal computers, PowerPC-based computing systems, ARM-based computing systems and other systems running a UNIX-based or other operating system. It should be understood that computing systems may also embody devices such as Personal Digital Assistants (PDAs), mobile phones, gaming consoles, set top boxes, etc.

When used in a LAN-networking environment, the computer system 1000 is connected (by wired connection or wirelessly) to a local network through the network interface or adapter 1024, which is one type of communications device. When used in a WAN-networking environment, the computer system 1000 typically includes a modem, a network adapter, or any other type of communications device for establishing communications over the wide area network. In a networked environment, program modules depicted relative to the computer system 1000 or portions thereof, may be stored in a remote memory storage device.

It is appreciated that the network connections shown are exemplary and other means of and communications devices for establishing a communications link between the computers may be used.

In accordance with an implementation, software instructions and data directed toward operating the subsystems may reside on the disk storage unit 1012, disk drive unit 1020 or other non-transitory storage medium units coupled to the computer system. Said software instructions may also be executed by CPU 1006.

The implementations described herein, such as one or more of those shown and described with reference to FIGS. 1-10, are implemented as logical steps in one or more computer systems. The logical operations are implemented (1) as a sequence of processor-implemented steps executing in one or more computer systems and (2) as interconnected machine or circuit modules within one or more computer systems. The implementation is a matter of choice, dependent on the performance requirements of a particular computer system. Accordingly, the logical operations making up the embodiments and/or implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims.

In some implementations, articles of manufacture are provided as computer program products. One implementation of a computer program product provides a transitory or non-transitory computer program storage medium readable by a computer system and encoding a computer program.

Furthermore, certain operations in the methods described above must naturally precede others for the described method to function as described. However, the described methods are not limited to the order of operations described if such order sequence does not alter the functionality of the method. That is, it is recognized that some operations may be performed before or after other operations without departing from the scope and spirit of the claims.

It is important to recognize, that while certain implementations described herein refer to optimization of one or more feature, system, operation, method, process or the like, actual mathematical or other optimization is not required in other implementations. While it may be possible to "optimize" a particular campaign, one of ordinary skill in the art would recognize from the teachings of the present disclosure, the similar techniques, systems and processes could also be used to improve campaigns, ad delivery or the like without achieving absolute optimization. Rather, different implementations provide for optimization or improved operation, planning, achievement, delivery, etc. of advertising campaigns.

Also, while example time periods and other variables were used to describe various implementations, other time periods and variables may be used instead.

Although implementations have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. An artificial intelligence analytics platform comprising:
a front end system comprising a processor and software, the front end system adapted to provide a plurality of buyer interfaces and seller interfaces to allow a buyer process, a planning and buying process, a seller process, and a selling and planning process to be consolidated into a single process, wherein the single process is adapted to aggregate bid data from the buyer interfaces; and
a backend analytics system comprising a processor and software, the backend analytics system in communication with the front end system via the plurality of buyer and seller interfaces, provide a workflow on a buy side in response to data received from the buyer interfaces to allow a buyer to implement a campaign across a plurality of different media distribution platforms comprising digital, linear, and addressable distribution platforms in a real-time bidding operation, constrain a seller inventory made available by a seller, allow a buyer to bid, randomize a plurality of bids, and provide feedback loops for measuring the effectiveness of the campaign based on actual delivery of insertions across the plurality of distribution platforms to provide the system a mechanism for course correction and stewardship through conversion modeling,
wherein the backend analytics platform is adapted to perform a utility forecast for each individual buyer based on historical data pricing data points and estimates of product value to the buyer and adjust the offered price from a floor value and to obfuscate buyer information via a randomization of the bid data within a threshold.

2. The artificial intelligence analytics platform of claim 1 wherein the process is adapted to provide a buyer to plan a campaign based on a plurality of campaign goals and purchase inventory in a direct sale.

3. The artificial intelligence analytics platform of claim 1 wherein the process allows a buyer to bid from a private marketplace.

4. The artificial intelligence analytics platform of claim 1 wherein the process is adapted to constrain the inventory made available by the seller and is further adapted to improve the seller inventory in an optimized way to design a campaign.

5. The artificial intelligence analytics platform of claim 1 wherein the utility forecast of the backend analytics platform comprises calculating a value of each of a plurality of inventory insertion opportunities via each of the different media distribution platforms.

6. The artificial intelligence analytics platform of claim 5 wherein the utility forecast is adapted to balance the calculated values to optimize a total value of inventory purchased.

7. The artificial intelligence analytics platform of claim 1 wherein the backend platform is adapted to provide a rate management component across each of the plurality of different media distribution platforms by analyzing supply and demand to establish a floor rate and then overlaying a utility-based model specific to the buyer.

8. The artificial intelligence analytics platform of claim 1 wherein the system is configured to bid within a number of cycles prior to one of the feedback loops.

9. The artificial intelligence analytics platform of claim 1 wherein the system is configured to obfuscate buyer information in the aggregate by obfuscating individual buyer information within an aggregate of unrelated buyers.

10. The artificial intelligence analytics platform of claim 1 wherein the system is configured to obfuscate the buyer information via obfuscating at least one target.

11. The artificial intelligence analytics platform of claim 1 wherein the system is configured to obfuscate buyer information via evaluating a plurality of inventory packages determined to be equivalent to a target audience.

12. The artificial intelligence analytics platform of claim 1 wherein the system is configured to obfuscate buyer information via evaluating a single one of the plurality of plurality of different media distribution platforms at a time.

13. The artificial intelligence analytics platform of claim 1 wherein the system is configured to obfuscate buyer information via obfuscating a media flight.

* * * * *